Aug. 19, 1958 R. K-F SCAL 2,848,697
PLUG-IN PACKAGED WAVEGUIDE ASSEMBLY
Filed July 21, 1954
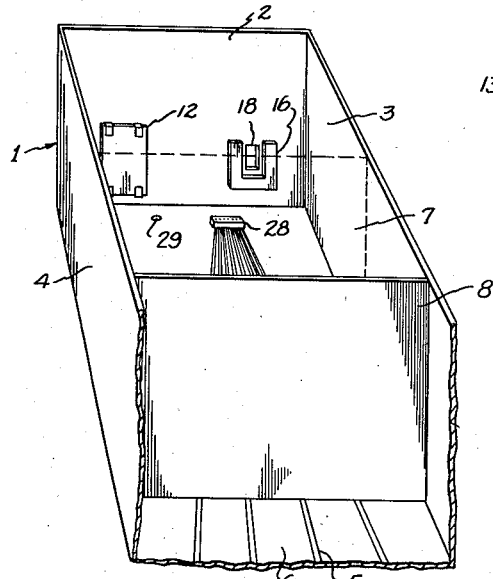
Fig. 1
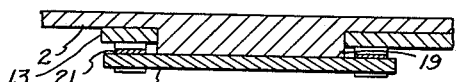
Fig. 3-A
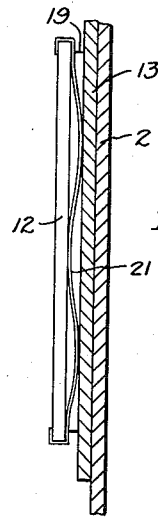
Fig. 3-B
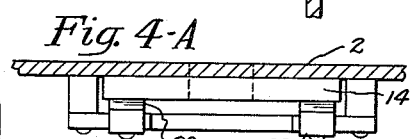
Fig. 4-A
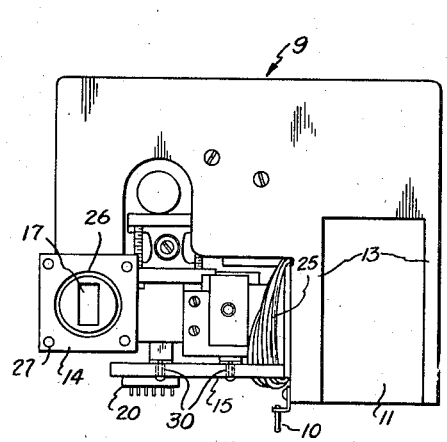
Fig. 2
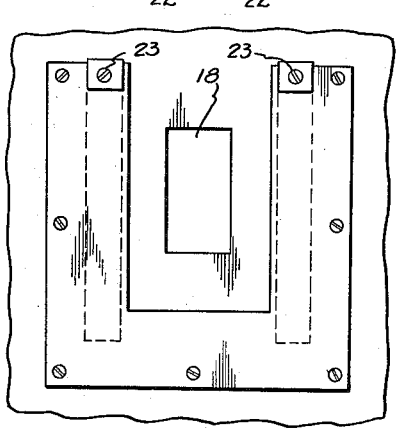
Fig. 4-B   Fig. 4-C
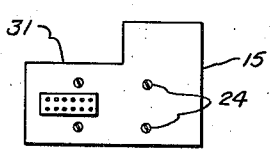
Fig. 5
INVENTOR
Robert K-F Scal
BY Arthur Vinograd
ATTORNEY

United States Patent Office 2,848,697
Patented Aug. 19, 1958

2,848,697

PLUG-IN PACKAGED WAVEGUIDE ASSEMBLY

Robert K-F Scal, Englewood, N. J., assignor to the United States of America as represented by the Secretary of Commerce Application July 21, 1954, Serial No. 444,927

2 Claims. (Cl. 333—98)

This invention relates to a packaged aircraft radar unit and more particularly to a plug-in packaged mixer-duplexer waveguide unit.

Modern aircraft require a great deal of electronic equipment in controlling the various and almost instantaneous functions associated with high-speed and even supersonic flight.

Much time and money has been expended in searching for ways and means of reducing the tremendous weight and space burden imposed upon present-day aircraft due to the necessity for so much electronic gear. One field of such endeavor has been directed toward reducing the size and weight of the radar equipment.

A particular project connected with the reduction in size and weight has been the development of a packaged radar transmitter-receiver unit utilizing miniaturized circuit techniques. It has been possible to construct such a unit, composed entirely of individual packages which slide into a chassis and make electrical contact with the rest of the circuitry.

In developing the package unit it was desirable to also provide a removable package of the microwave plumbing circuitry as well as the various other circuits associated with the unit. Applicant met this demand by developing a microwave plumbing unit which slides into the front compartment of the miniaturized circuit chassis and in which the direct-current electrical connections as well as the waveguide connection are positively established as the microwave package is inserted.

An object of this invention is to provide a microwave plumbing package capable of effecting the direct-current and waveguide electrical connections upon insertion into a chassis.

Another object of this invention is to provide a removable package capable of effecting a waveguide-to-waveguide connection upon insertion of the package into the entire unit.

An additional object of this invention is to provide sliding coupling means for waveguides.

Other uses and advantages of the invention will become apparent upon reference to the specification and the drawings.

Figure 1 shows the drawerlike chassis including separate circuit package compartments.

Figure 2 shows the plumbing package unit before being inserted into the front compartment of the radar chassis.

Figures 3a and 3b are top and side views respectively of the plumbing package supporting structure.

Figures 4a, 4b, and 4c are top, front, ad side views, respectively, of the waveguide coupling structure.

Figure 5 shows a bottom view of the processed-circuit board of Figure 2.

Figure 1 shows a cut-away view of the chassis generally indicated as 1 for housing the various electronic circuitry packages, as it would appear looking from the back toward the front of the chassis. Applicant has illustrated only two compartments plus a portion of a third, but it will be understood that a larger number is generally utilized. The first or front compartment is enclosed by front panel 2, part of side walls 3 and 4, part of the bottom plate 6 and dividing wall 7, shown in dotted lines so that the various electrical connections of the front compartment may be seen. A similar dividing wall is shown fully at 8 and serves to separate the second and third compartments. For the purpose of illustration the compartments are shown as approximately of equal size, but it is obvious that different circuitry might require compartments of various sizes, and the present invention should not be interpreted as limited to equal-sized compartments.

Conductive strips 5 are shown passing along the bottom plate of casing 1 to the plug connector 28 situated in the front compartment. The function of these electrical conductive strips will be explained later.

The plumbing package 9 is shown in Figure 2. It consists of various mixer-duplexer circuitry, the internal structure of which constitutes no part of the present invention. The view is taken of the front of the package 9, in other words, looking at the side that is adjacent to front panel 2 when positioned in the compartment.

The cut-out section 11 of package 9 is shaped to slide over a boss 19 on the front panel 2 shown in Figure 1. Edges 13 of cut-out section 11 slip over boss 19 and serve to tightly support as well as position the package within the compartment. A flat plate 12 mounted on the front panel 2 holds the plumbing package captive and two springs 21 exert pressure on edges 13 to prevent movement of the package.

Microwave energy is transmitted to and from the package unit by means of a section of waveguide terminating in waveguide flange 14 which slips in between panel 2 and U-shaped member 16, which is also secured to panel 2 as illustrated in Figure 1. Waveguide channel 17 is fixedly positioned adjacent slot 18 (Figure 1) in the front panel 2 so that a continuous waveguide microwave path is formed from the package to a circuit external to the chassis, which circuit is not shown but may be any conventional radiating and receiving circuit for the radar microwave unit.

In order to insure proper positioning of the package as well as support it in its compartment, pin 10 is provided at the bottom. This pin engages hole 29 in bottom plate 6 and in conjunction with the support means comprising edges 13 and plate 12 insures that waveguide channel 17 is properly aligned with slot 18 in front panel 2.

Near the bottom of the package 9 is a processed-circuit board 15 (which may be printed, etched, silk-screened, etc.) including male plug 20 adapted to fit into socket 28 in the front compartment of chassis 1. Connections from the plumbing circuitry to board 15 are made via leads 25. Through the plug and socket connection the package 9 is coupled to the various other packages in the other compartments of the chassis 1. As can be seen from Figure 1, this coupling is effected by means of conductive strips 5 connected to the D.-C. supplies, AFC signals, and biases contained in the other packages.

Figures 3a and 3b show enlarged top and side views, respectively, of plate 12 of Figure 1. Panel 2 may be formed with a raised flat rectangular plate portion 19 to which a slightly larger plate 12 may be fastened in any desired conventional manner, such as by screws or by welding. Elongated flat spring members 21 are fastened to plate 12 and serve to engage the edges 13 of cut-out portion 11 and force edges 13 against the panel 2, thus producing a tight support for the package unit. The spring members 21 may be formed of flat spring steel and merely curled over the top and bottom of plate 12. Slight slots (not shown) in the top and bottom edges of plate 12 may be provided if necessary to prevent lateral movement of spring elements 21.

Figures 4a–4c show top, front, and side views, respectively, of the waveguide junction means of Figure 1.

The waveguide flange 14 fits between the U-shaped member 16 and the panel 2 as seen in Figures 4a and 4c.

Spring members 22 are fastened to U-shaped member 16 by means of screws 23 which engage threaded holes in U-shaped member 16. These springs enable the waveguide junction to be tightly made and prevent any sliding motion of flange 14, and therefore channel 17, with respect to slot 18 in panel 2.

As can be seen from Figure 2, the flange 14 is provided with a conventional quarter-wave choke 26 with holes 27. The holes 27 are not ordinarily used but provide means for attaching test equipment to the package unit when it is removed from its compartment in chassis 1.

Figure 5 is a bottom view of the processed circuit board of Figure 2. The various circuit elements contained thereon will not be discussed, since they form no part of this invention. However, board 15 includes a cut-out portion 31 which provides clearance for waveguide flange 14. It will be noted that the normal position of this processed-circuit board is horizontal, as shown in Figure 2, with the male contact plug 20 positioned to make contact with the female receptacle 28 connected to the processed leads 6 running along the bottom plate 5 of chassis 1. The board is held captive in position by means of screws 24, which may include tubular fillers 30 to allow a small amount of play so that proper contact between plug 20 and receptacle 28 may be easily achieved.

Applicant has provided a microwave packaged unit which, upon insertion into its compartment in a drawer-like chassis, makes waveguide as well as direct-current electrical connections automatically as the packaged unit slides into its chassis compartment.

It will be apparent that the embodiments shown are only exemplary and that various modifications can be made in construction and arrangement within the scope of the invention as defined in the appended claims.

What is claimed is:

1. A microwave coupling comprising a section of rectangular waveguide including a waveguide channel and a flange at one end, a flat supporting plate having a microwave aperture for receiving said waveguide, substantially U-shaped means secured to said plate about three sides of said aperture in spaced relation thereto defining a nesting space for receiving said flange, said U-shaped means being dimensionally oriented with respect to said microwave aperture and said waveguide channel to produce exact registry between said channel and aperture and self-acting spring means for resiliently containing said flange between said plate and said U-shaped means upon insertion of said flange into said nesting space in a direction parallel to said plate.

2. A microwave plug-in-package-unit assembly comprising a removable microwave plug-in-package unit including a section of rectangular waveguide having a flange at one end, a chassis for said unit comprising at least one open-topped compartment with a microwave aperture in one wall thereof, said chassis having electrical means cooperative with said package unit including electrical socket means, plug means on said unit adapted to fit in said socket, means for both supporting and positioning said unit in said compartment, additional means for positioning said unit in said compartment to align said waveguide section in registry with said microwave aperture and self-acting spring means operable by the insertion of said unit into said compartment in a direction parallel to said wall for receiving said flange in engagement with said wall.

References Cited in the file of this patent

UNITED STATES PATENTS

| | | |
|---|---|---|
| 2,103,106 | Yurkovitch | Dec. 21, 1937 |
| 2,421,790 | Korman | June 10, 1947 |
| 2,530,836 | Mumford | Nov. 21, 1950 |
| 2,611,040 | Brunetti | Sept. 11, 1952 |
| 2,643,139 | Hamilton | June 23, 1953 |
| 2,691,724 | Hoffman | Oct. 12, 1955 |